US012389505B2

(12) United States Patent
Janik et al.

(10) Patent No.: US 12,389,505 B2
(45) Date of Patent: Aug. 12, 2025

(54) LIGHT TURN-OFF FADE TIME CONTROL

(71) Applicant: SIGNIFY HOLDING B.V., Eindhoven (NL)

(72) Inventors: Raymond George Janik, Fayetteville, GA (US); Melisa Altamirano-Ruelas, Denver, CO (US); Russell Scott Trask, Sharpsburg, GA (US)

( * ) Notice: Subject to any disclaimer, the term of this patent is extended or adjusted under 35 U.S.C. 154(b) by 143 days.

(21) Appl. No.: 18/283,018

(22) PCT Filed: Mar. 25, 2022

(86) PCT No.: PCT/EP2022/057896
§ 371 (c)(1),
(2) Date: Sep. 20, 2023

(87) PCT Pub. No.: WO2022/207483
PCT Pub. Date: Oct. 6, 2022

(65) Prior Publication Data

US 2024/0172345 A1 May 23, 2024

Related U.S. Application Data

(60) Provisional application No. 63/167,162, filed on Mar. 29, 2021.

(30) Foreign Application Priority Data

Apr. 13, 2021 (EP) .................................... 21168142

(51) Int. Cl.
*H05B 45/325* (2020.01)

(52) U.S. Cl.
CPC .................................. *H05B 45/325* (2020.01)

(58) Field of Classification Search
CPC ....... H05B 45/325; H05B 45/59; H05B 45/30
(Continued)

(56) References Cited

U.S. PATENT DOCUMENTS 10,638,580 B2 * 4/2020 Wu ........................ H05B 45/14
11,153,949 B2 * 10/2021 Yang ...................... H05B 45/59
(Continued)

FOREIGN PATENT DOCUMENTS

CN 105451403 B 1/2019
CN 109327934 A 2/2019
(Continued)

*Primary Examiner* — Ryan Jager

(57) ABSTRACT

A light fade controller includes an input power detection circuit configured to detect whether an input power is available. The light fade controller further includes a power discharge circuit configured to enable a power discharge path to discharge output power from a driver circuit through the power discharge path in response to the input power detection circuit detecting that the input power is unavailable. The power discharge circuit is also configured to adjust a rate of power discharge through the power discharge path, and the power discharge circuit either: a) includes a switch (306) that is controlled by a pulse width modulation (PWM) control signal to enable and disable the power discharge path and to adjust the rate of power discharge through the power discharge path, wherein a pulse width of the PWM signal is adjusted to enable and disable the power discharge path and to adjust the rate of power discharge through the power discharge path; or b) is configured to adjust the rate of power discharge based on a user input provided to the power discharge circuit.

9 Claims, 4 Drawing Sheets

(58) Field of Classification Search
USPC .......................................................... 315/291
See application file for complete search history.

(56) References Cited

U.S. PATENT DOCUMENTS

| | | | | |
|---|---|---|---|---|
| 11,297,702 | B2 * | 4/2022 | Chang | H03K 3/356017 |
| 11,602,027 | B2 * | 3/2023 | Wu | H05B 45/305 |
| 2004/0075394 | A1 * | 4/2004 | Ito | H05B 45/375<br>315/77 |
| 2015/0130903 | A1 * | 5/2015 | Thompson | H01S 5/042<br>372/38.07 |
| 2015/0208479 | A1 * | 7/2015 | Radermacher | H05B 45/14<br>315/307 |
| 2018/0027622 | A1 * | 1/2018 | Doi | H05B 45/10<br>315/307 |
| 2019/0159310 | A1 * | 5/2019 | Yang | H02M 3/157 |
| 2020/0260552 | A1 * | 8/2020 | Yang | H05B 45/345 |
| 2021/0368603 | A1 * | 11/2021 | Takahashi | H05B 45/3575 |
| 2024/0172345 | A1 * | 5/2024 | Janik | H05B 45/59 |

FOREIGN PATENT DOCUMENTS

| | | | |
|---|---|---|---|
| EP | 3393207 | A1 | 10/2018 |
| WO | 2020166451 | A1 | 8/2020 |

* cited by examiner

LIGHT TURN-OFF FADE TIME CONTROL

CROSS-REFERENCE TO PRIOR APPLICATIONS

This application is the U.S. National Phase application under 35 U.S.C. § 371 of International Application No. PCT/EP2022/057896, filed on Mar. 25, 2022, which claims the benefit of European Patent Application No. 21168142.4, filed on Apr. 13, 2021, and U.S. Provisional Application Ser. No. 63/167,162, filed Mar. 29, 2021. These applications are hereby incorporated by reference herein.

TECHNICAL FIELD

The present disclosure relates generally to lighting fixtures, and more particularly to fade times of lights provided by light fixtures.

BACKGROUND

Drivers are typically used to provide power to light sources and other components of light fixtures. For example, a driver may receive alternating-current (AC) input and provide a direct-current (DC) output to a light source of a light fixture. To illustrate, a current-source LED driver can be used to provide power to a light emitting diode (LED) light fixture. Such drivers typically incorporate one or more DC/output capacitors at the output stages of the driver to reduce flicker in the light provided by light fixtures. For example, an output capacitor that has a relatively larger capacitance generally results in lower light flicker. When the AC power provided to the driver of a light fixture is turned off, a relatively larger capacitance of the output capacitor can result in an increased fade time of the light provided by the light fixture. In a lighting system that has multiple light fixtures that are controlled by a common control (e.g., a switch), tolerance and other differences in relatively large capacitance values of output capacitors of the respective drivers may result in light fade time variations among the lights provided by the light fixtures. In such circumstances, lights from some light fixtures may be completely off while lights from other light fixtures will remain on until respective capacitors are adequately discharged. Thus, a solution that enables adjustments of the fade time of a light provided by a light fixture may be desirable.

SUMMARY

The present disclosure relates generally to lighting fixtures, and more particularly to fade times of lights provided by light fixtures. In an example embodiment, a light fade controller includes an input power detection circuit configured to detect whether input power is available. The light fade controller further includes a power discharge circuit configured to enable a power discharge path to discharge output capacitor of a driver circuit through the power discharge path in response to the input power detection circuit detecting that the input power is unavailable. The power discharge circuit is also configured to adjust a rate of power discharge through the power discharge path.

In another example embodiment, a driver unit includes a driver circuit configured to receive input power and generate, from the input power, output power compatible with a light source of a lighting device. The driver unit further includes a light fade controller that includes an input power detection circuit configured to detect whether the input power is available to the driver circuit. The light fade controller further includes a power discharge circuit configured to enable a power discharge path to discharge output power from the driver circuit through the power discharge path in response to the input power detection circuit detecting that the input power is unavailable to the driver circuit and to adjust a rate of power discharge through the power discharge path.

These and other aspects, objects, features, and embodiments will be apparent from the following description and the appended claims.

BRIEF DESCRIPTION OF THE FIGURES

Reference will now be made to the accompanying drawings, where.

Figure 1:
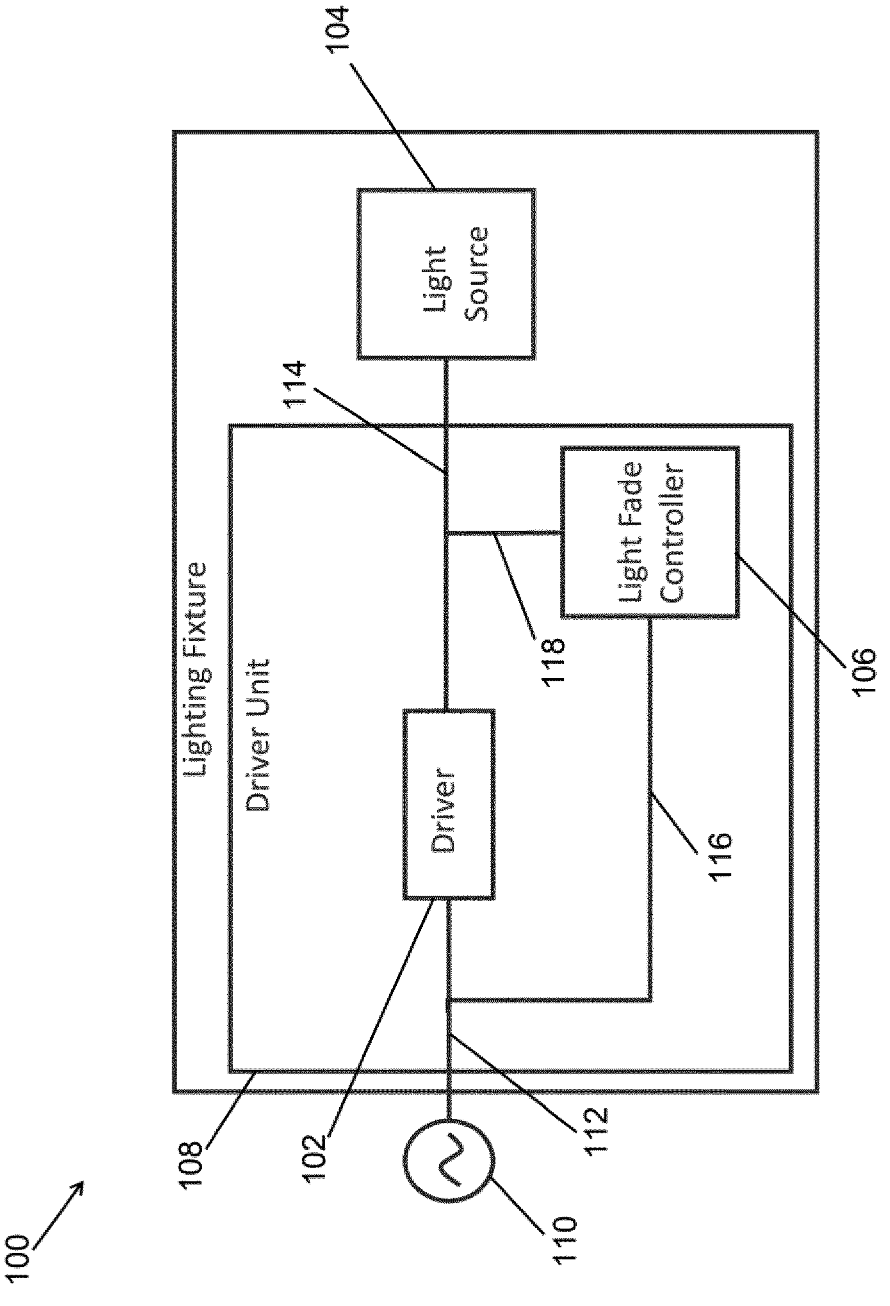
FIG. 1 illustrates a light fixture including a light fade controller according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

FIG. 1 illustrates a light fixture 100 including a light fade controller 106 according to an example embodiment. In some example embodiments, the light fixture 100 includes a lighting driver 102, a light source 104, and the light fade controller 106. For example, the lighting driver 102 may be a standalone driver or a driver circuit that is included in a driver unit 108 along with the light fade controller 106. The driver 102 may receive input power (e.g., AC power) from a power source 110 via an electrical connection 112 (e.g., one or more electrical wires) and generate output power (e.g., DC power) that is provided to the light source 104. For example, the driver 102 may be a current source driver, and the output power from the driver 102 may be provided to the light source 104 via an electrical connection 114 (e.g., one or more electrical wires).

In some example embodiments, the light source 104 may include one or more light emitting diodes (LEDs) that emit a light (e.g., an illumination light). When the input power is provided to the driver 102, the output power that the driver 102 provides to the light source 104 is compatible with the light source 104 to enable the light source 104 to emit the light. When the power source 110 is turned off (i.e., when the input power is not available to the driver 102), the light source 104 may continue to emit the light until the output power is adequately discharged from the driver 102 such that the voltage level on the connection 114 is no longer adequate to turn on the light source 104.

In some example embodiments, when the input power from the power source 110 is turned off or otherwise becomes unavailable to the driver 102, the driver 102 may continue to provide the output power on the connection 114, for example, from one or more DC/output capacitors of the driver 102. For example, when the input power is unavailable to the driver 102, a portion of the output power may be discharged through the light source 104, and a portion of the output power may be discharged through a power discharge path controlled by the light fade controller 106.

In some example embodiments, when the input power becomes unavailable to the driver 102, the light fade controller 106 may enable the power discharge path that can be used to discharge at least a portion of the output power from the driver 102. To illustrate, the power source 110 may be electrically connected to the light fade controller 106 via an electrical connection 116 (e.g., one or more electrical wires). For example, the electrical connection 116 may be directly connected to the power source 110 or may be connected to the electrical connection 112, which is connected to the power source 110.

In some example embodiments, the light fade controller 106 may detect when the input power from the power source 110 is unavailable and enable the power discharge path in response to detecting that the input power is unavailable. For example, enabling the power discharge path can result in the output power from the driver 102 being discharged relatively quickly compared to the time that would take to discharge the output power just through the light source 104. Discharging at least a portion of the output power through the discharge path can result in a relatively shorter fade time of the light emitted by the light source 104 when the input power from the power source 110 becomes unavailable to the driver 102.

In some example embodiments, the power discharge path may include an electrical connection 118 (e.g., one or more electrical wires) that electrically connects the output of the driver 102 and the light fade controller 106. In general, the power discharge path may provide a current path between the output of the driver 102 and an electrical ground and may include the connections 114, 118, and/or one or more components of the light fade controller 106 (as more clearly shown in FIG. 3). As explained in more detail below, the light fade controller 106 may adjust the rate of power discharge through the power discharge path to a desired rate of power discharge. For example, the light fade controller 106 may adjust the rate of power discharge based on a user input provided to the light fade controller 106. The light fade controller 106 may adjust the rate of power discharge through the power discharge path such that the light emitted by the light source 104 is fully turned off within or at a particular time after the input power from the power source 110 becomes unavailable to the driver 102. In general, the light fade controller 106 may adjust the rate of power discharge such that the output power from the driver 102 is discharged relatively slow or fast.

In some example embodiments, the light fade controller 106 may operate using the output power from the driver 102 to enable and maintain the power discharge path even when the input power from the power source 110 is unavailable. To illustrate, the light fade controller 106 may operate using the output power from the driver 102 until the voltage level on the connection 114 becomes too low to allow continued operation. Because the voltage level required by the light fade controller 106 is lower than the voltage level required by the light source 104 to emit a light, the light fade controller 106 may continue to operate using the output power from the driver 102 even after the voltage level on the connection 114 becomes too low for the light source 104 to continue emitting the light. The relatively lower voltage level required by the light fade controller 106 compared to the voltage level required by light source 104 allows the light fade controller 106 to control the fade time of the light emitted by the light source 104 by enabling the power discharge path to discharge the output power from the driver 102 when the input power from the power source 110 becomes unavailable and by controlling the rate of discharge of the output power through the power discharge path.

When the input power is available to the driver 102, the light fade controller 106 may disable or maintain as disabled the power discharge path. To illustrate, the light fade controller 106 may detect when the input power from the power source 110 is available and, in response, disable or maintain as disabled the power discharge path. Because the power discharge path is disabled when the input power is available, the output power from the driver 102 can be fully provided to the light source 104 via the connection 114.

By enabling a power discharge path that facilitates the discharging of the output power from the driver 102, the light fade controller 106 can enable a faster discharging of the output power from the driver 102 when the input power from the power source 110 becomes unavailable to the driver 102. By controlling the rate of discharge of the output power, the light fade controller 106 can control the fade time of the light emitted by the light source 104 when the input power from the power source 110 becomes unavailable to the driver 102. Controlling the fade time of the light emitted by the light source 104 can result in lights from multiple light fixtures of a lighting system that are commonly controlled (e.g., by a power switch) to have closely matching fade times or fade times that have desired variations. For example, a person can provide respective inputs to one or more light fixtures that include the light fade controller 106 such that the lights emitted by the one or more light fixtures are off at substantially the same time as a light emitted by a reference light fixture.

Although FIG. 1 shows the light fixture 100, in some alternative embodiments, the light fade controller 106 may be used in another type of lighting device without departing from the scope of this disclosure. In some example embodiments, the driver 102 and the light fade controller 106 may be integrated in a single device without departing from the scope of this disclosure. In some alternative embodiments, the driver 102 and the light fade controller 106 may be standalone devices that may integrated in or coupled to a light fixture or another lighting device without departing from the scope of this disclosure. In some alternative embodiments, the driver unit 108 may be external to the light fixture 100 without departing from the scope of this disclosure. In some example embodiments, the components of the light fixture 100 may be connected using different connections than shown without departing from the scope of this disclosure.

Figure 2:
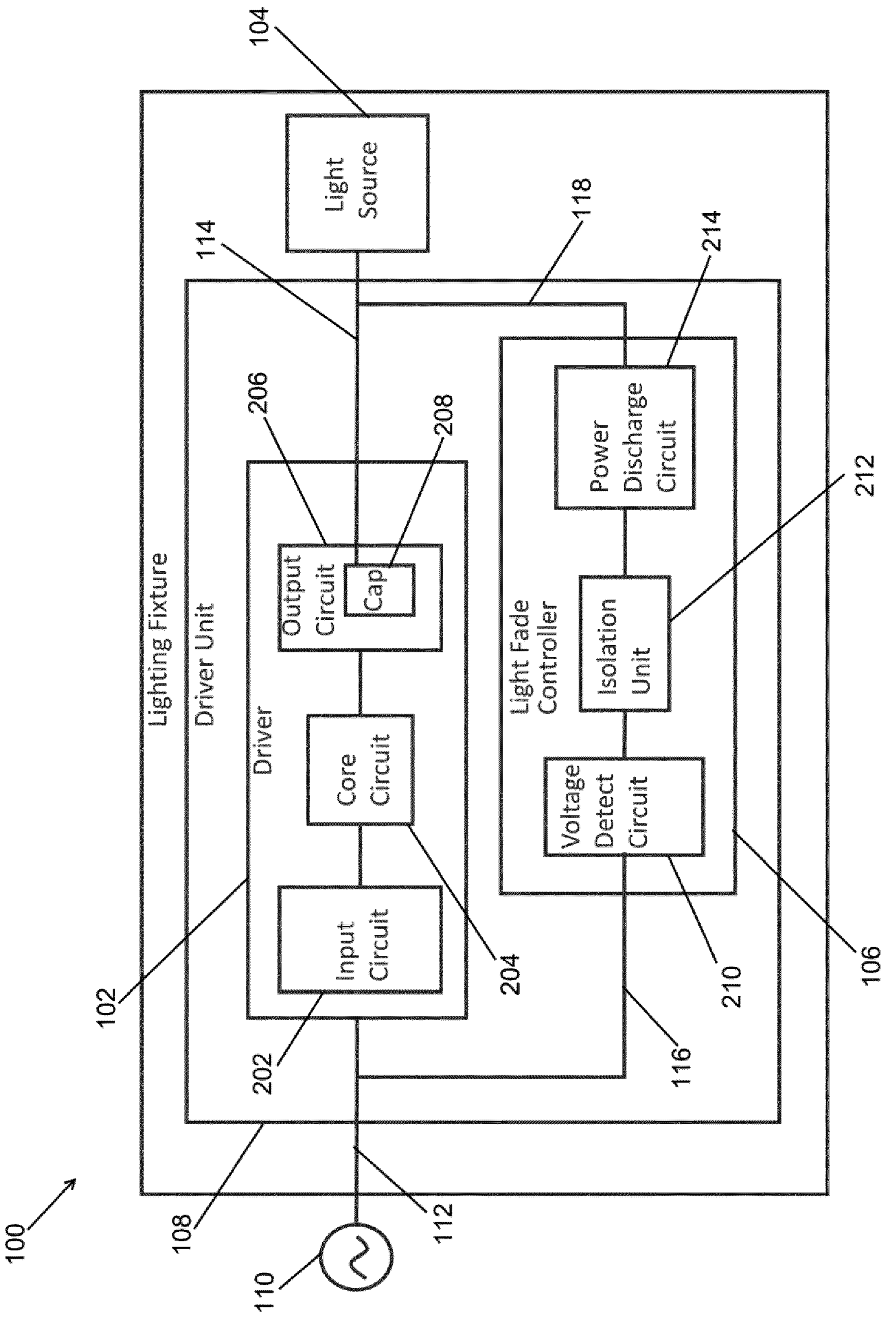
FIG. 2 illustrates the light fixture of FIG. 1 including some components of the light fade controller according to an example embodiment.

FIG. 2 illustrates the light fixture 100 of FIG. 1 showing some components of the light fade controller 106 according to an example embodiment. Referring to FIGS. 1 and 2, in some example embodiments, the driver 102 includes an input circuit 202, a core circuit 204, and an output circuit 206. For example, the input circuit 202 may include a fuse, a common mode choke, a rectifier, and/or other components as readily understood by those of ordinary skill in the art with the benefit of the scope of this disclosure. The core circuit 204 may include a power management and/or other components that may control the output power provided by the output circuit 206, which may include one or more DC/output capacitors 208 and other components such as a transformer, etc. The input circuit 202, the core circuit 204, and the output circuit 206 may be coupled and operated to generate output power on the connection 114 from the input power provided to the driver 102 via the connection 112 as can be readily understood by those of ordinary skill in the art with the benefit of the scope of this disclosure.

In some example embodiments, the light fade controller 106 may include an input power detection circuit 210, an isolation unit 212, and a power discharge circuit 214. The input power detection circuit 210 may be electrically coupled to the power source 110 such that the input power detection circuit 210 can detect whether the input power from the power source 110 is provided to the driver 102. For example, the input power detection circuit 210 may detect the voltage level on the connection 116 to determine whether the input power from the power source 110 is available to the driver 102.

Figure 4:
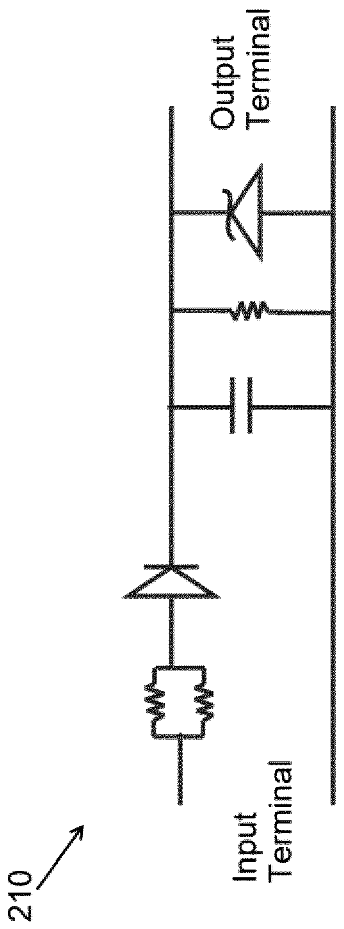
FIG. 4 illustrates an input power detection circuit of the light fade controller of FIGS. 1 and 2 according to an example embodiment.

In some example embodiments, the power source 110 may provide AC power to the driver 102 via the connection 112, and the input power detection circuit 210 may detect whether AC voltage is available to the driver 102. FIG. 4 shows the input power detection circuit 210 of the light fade controller of FIGS. 1 and 2 according to an example embodiment, where the input terminal of the input power detection circuit 210 shown in FIG. 4 can be connected to the connection 116, and the output terminal can be connected to the power discharge circuit 214 shown in FIGS. 1 and 2. In some alternative embodiments, the light fade controller 106 may include a different input power detection circuit than the input power detection circuit 210 shown in FIG. 4 without departing from the scope of this disclosure.

In some example embodiments, the isolation unit 212 may electrically isolate the input power detection circuit 210 from the power discharge circuit 214. For example, the isolation unit 212 may include an optocoupler that has an input coupled to the input power detection circuit 210 and an output coupled to the power discharge circuit 214.

In some example embodiments, when the input power from the power source 110 becomes unavailable to the driver 102, the power discharge circuit 214 may operate to enable the power discharge path to discharge at least a portion of the output power from the driver 102 through the discharge path. The power discharge path may include the connection 114 and one or more components of the power discharge circuit 214 as explained below in more detail with respect to FIG. 3. The power discharge circuit 214 may enable the power discharge path when the input power detection circuit 210 indicates, through the isolation unit 212, that the input power from the power source 110 is unavailable. When the power discharge path is enabled, at least a portion of the energy stored in the one or more capacitors 208 may be discharged through the power discharge path. When the input power from the power source 110 is available to the driver 102, the power discharge circuit 214 may disable or maintain as disabled the power discharge path such that the output power from the driver 102 is not discharged through the power discharge path.

In some alternative embodiments, some of the components of the driver 102 and the light fade controller 106 may be integrated in a single device. In some alternative embodiments, the input circuit 202, the core circuit 204, and the output circuit 206 may each include other components instead of or in addition to the components described above. In some alternative embodiments, the driver 102 and the light fade controller 106 may each include different components than shown without departing from the scope of this disclosure. In some example embodiments, the components of the light fixture 100 may be connected using different connections than shown without departing from the scope of this disclosure.

Figure 3:
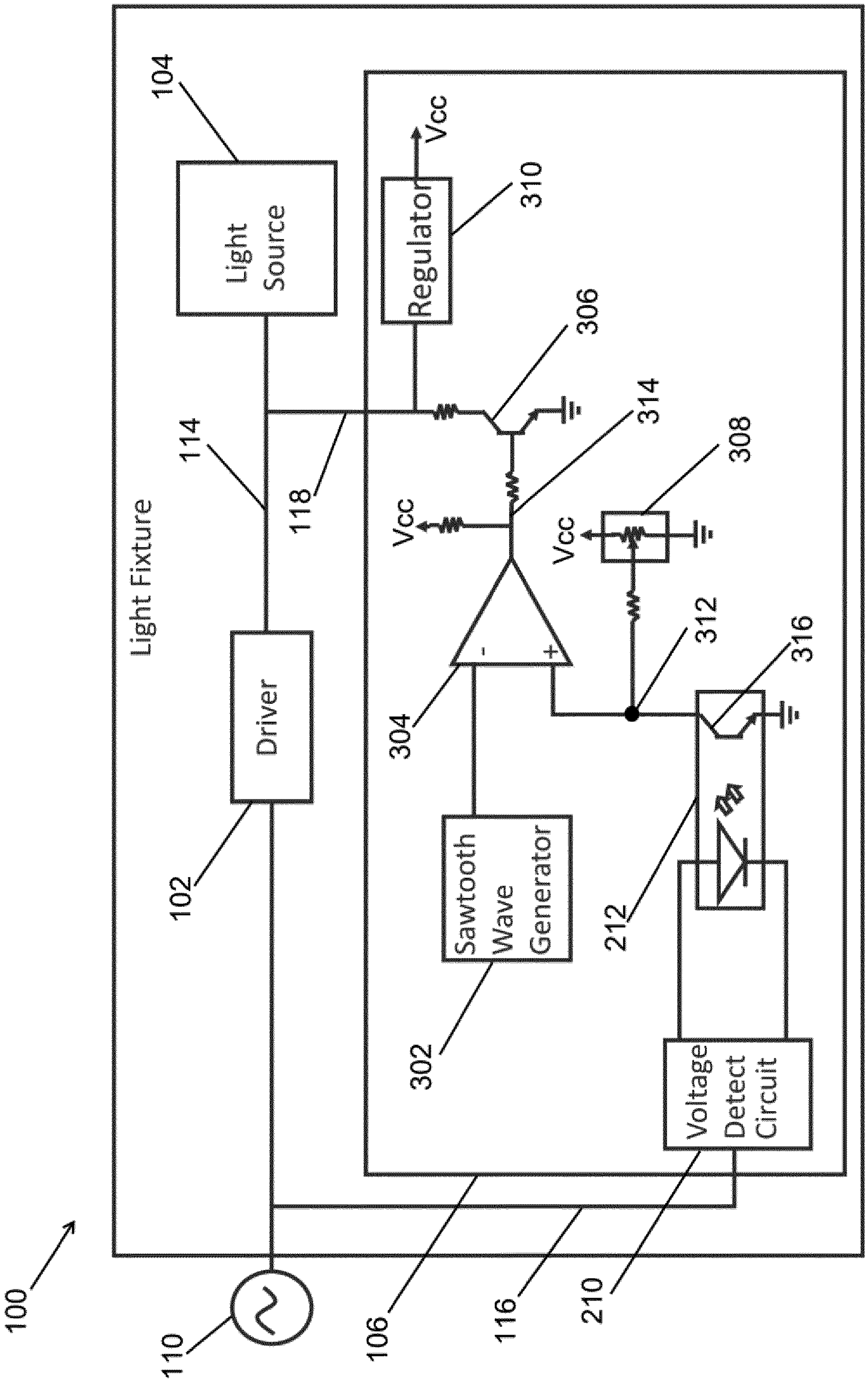
FIG. 3 illustrates the light fixture 100 of FIGS. 1 and 2 and components of the light fade controller 106 of the light fixture 100 according to an example embodiment.

FIG. 3 illustrates the light fixture 100 of FIGS. 1 and 2 and components of the light fade controller 106 of the light fixture 100 according to an example embodiment. Referring to FIGS. 1-3, in some example embodiments, the light fade controller 106 includes the input power detection circuit 210 and the isolation unit 212. The light fade controller 106 may also include a sawtooth wave generator 302, an operational amplifier or comparator 304, and a transistor 306 that operates as a switch and that is controlled by a control signal from the operational amplifier or comparator 304. The transistor 306 may be coupled to the driver 102 and may be controlled by the control signal from the operational amplifier or comparator 304 to enable and disable the power discharge path that can be used to discharge the output power from the driver 102. For example, the power discharge path may include the transistor 306 that is coupled to the output of the driver 102 via the electrical connections 114, 118. To illustrate, the transistor 306 may complete a current path to discharge the energy stored in the one or more capacitors 208 (shown in FIG. 2).

In some example embodiments, the light fade controller 106 may also include a potentiometer 308, shown in FIG. 3, that has an adjustable resistance as can be readily understood by those of ordinary skill in the art. For example, the potentiometer 308 may be adjusted by a person to adjust the rate of power discharge of the output power through the power discharge path. For example, the control signal provided to the transistor 306 by the operational amplifier 304 may control the rate of power discharge through the transistor 306 based on the setting of the potentiometer 308.

In some example embodiments, the isolation unit 212 may include an optocoupler including a transistor 316 that may be turned on or off depending on whether the input power detection circuit 210 detects the input power on the connection 116. For example, the transistor 316 may be on when the input power is available and off when the input power is unavailable.

Figure 5:
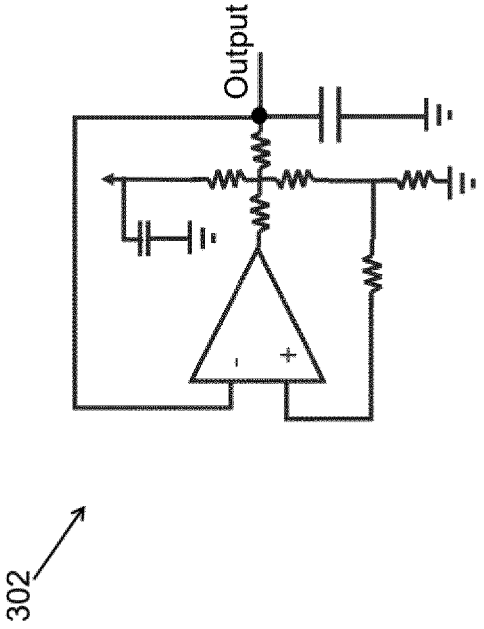
FIG. 5 illustrates a sawtooth wave generator of the light fade controller of FIGS. 1 and 2 according to an example embodiment.

In some example embodiments, the transistor 316 may be coupled to a node 312 that is coupled to the potentiometer 308 and to a positive input of the operational amplifier 304. A negative input of the operational amplifier 304 may be coupled to the output of the sawtooth wave generator 302 that generates a sawtooth waveform signal. FIG. 5 illustrates the sawtooth wave generator 302 of the light fade controller of FIGS. 1 and 2 according to an example embodiment. In some alternative embodiments, the power discharge circuit 214 may include a different sawtooth wave generator than the sawtooth wave generator 302 shown in FIG. 5 without departing from the scope of this disclosure.

In some example embodiments, the operational amplifier 304 may generate the control signal that is provided to the transistor 306 via an electrical connection 314 (e.g., one or more electrical wires) based on the voltage levels at the inputs of the operational amplifier 304. To illustrate, because the transistor 316 is on when the input power from the power source 110 is available, the positive input of the operational amplifier 304 is coupled to ground when the input power is available. The positive input of the operational amplifier 304 being coupled to ground results in the control signal provided to the transistor 306 by the operational amplifier 304 being low. Because the transistor 306 is off when the control signal provided by the operational amplifier 304 is low, the power discharge path that includes the transistor 306 is disabled when the input power from the power source 110 is available on the connections 112, 116.

When the input power from the power source 110 is unavailable on the connections 112, 116 as determined by the input power detection circuit 210, the transistor 316 is turned off and the voltage level at the positive input of the operational amplifier 304 depends on the setting of the potentiometer 308. For example, when the input power from the power source 110 is unavailable, the control signal generated by the operational amplifier 304 and provided to the transistor 306 via the connection 314 may be a pulse width modulation (PWM) signal that has a pulse width that depends on the setting of the potentiometer 308. To illustrate, the potentiometer 308 may be adjusted by a user such that the PWM signal has a 100% duty cycle. When the PWM signal has a 100% duty cycle, the output power from the driver 102 may be discharged through the power discharge path at a maximum discharge rate. The potentiometer 308 may be adjusted by a user independent of whether the input power from the power source 110 is available to the driver 102.

In some example embodiments, the pulse width of the PWM signal may also be adjusted such that the duty cycle of the PWM signal is closer to 0%, which may result in the output power from the driver 102 being discharged through the power discharge path at a very slow discharge rate. In general, the power discharge circuit 214 shown in FIG. 2 may control the pulse width of the PWM signal based on the setting of the potentiometer 308 such that the PWM signal has a duty cycle between 0% and 100% and to accordingly control the rate of power discharge through the power discharge path that includes the transistor 306. The fade time of the light provided by the light source 104 is dependent on the rate of power discharge through the power discharge path and is accordingly adjusted by adjusting the potentiometer 308.

In some example embodiments, the light fade controller 106 may include a regulator 310 that generates an output voltage Vcc from the output voltage provided by the driver 102 on the connections 114, 118. To illustrate, the regulator 310 may be coupled to the connection 118 that is electrically connected to the output of the driver 102. The output voltage Vcc from the regulator 310 is provided to the components of the light fade controller 106 that require the voltage Vcc. In general, when the input power from the power source 110 turned off, the regulator 310 may continue to generate the output voltage Vcc at least until the voltage level on the connections 114, 118 is below the voltage level that is required by the light source 104 to emit a light. For example, the voltage Vcc may have a voltage level (e.g., 5V) that enables the components of the light fade controller 106 to operate for a time period after the input power from the power source 110 is turned off. The operation of the light fade controller 106 after the input power is turned off allows the light fade controller 106 to provide the power discharge path to discharge the output power from the driver 102 upon the detection that the input power from the power source 110 is unavailable and to adjust the rate of power discharge.

In some example embodiments, the driver 102 and the light fade controller 106 may be included in the driver unit 108 as shown in FIGS. 1 and 2 without departing from the scope of this disclosure. In some example embodiments, the power discharge circuit 214 shown in FIG. 2 may include the sawtooth wave generator 302, the operational amplifier 304, the transistor 306, and the potentiometer 308. In some alternative embodiments, another type of variable resistor may be used instead of the potentiometer 308 without departing from the scope of this disclosure. In some example embodiments, the components of the light fade controller 106 may be integrated with the components of the driver 102 without departing from the scope of this disclosure. In some alternative embodiments, one or more of the components of the light fade controller 106 may be integrated into a single component without departing from the scope of this disclosure. In some alternative embodiments, the light fade controller 106 may include different components than shown without departing from the scope of this disclosure. In some example embodiments, the components of the light fade controller 106 may be connected using different connections than shown without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the scope of the following claims, the scope of which are to be accorded the broadest interpretation so as to encompass modifications and equivalent structures.

The invention claimed is:

1. A light fade controller (106), comprising:

an input power detection circuit (210) configured to detect whether an input power is available; and a power discharge circuit (214) configured to:

enable a power discharge path (118, 306) to discharge output power from a driver circuit (102) through the power discharge path in response to the input power detection circuit detecting that the input power is unavailable;

adjust a rate of power discharge through the power discharge path; and wherein the power discharge circuit: (1) includes a switch (306) that is controlled by a pulse width modulation (PWM) control signal to enable and disable the power discharge path and to adjust the rate of power discharge through the power discharge path, wherein a pulse width of the PWM signal is adjusted to enable and disable the power discharge path and to adjust the rate of power discharge through the power discharge path, or (2) is configured to adjust the rate of power discharge based on a user input provided to the power discharge circuit.

2. The light fade controller of claim 1, wherein the input power is alternating current (AC) power.

3. The light fade controller of claim 2, further comprising an isolation unit (212) configured to electrically isolate the input power from the power discharge circuit (214).

4. The light fade controller of claim 1, wherein the power discharge circuit is configured to disable or maintain as disabled the power discharge path in response to detecting that the input power is available.

5. A driver unit (108), comprising:

a driver circuit (102) configured to receive input power and generate, from the input power, output power compatible with a light source (104) of a lighting device (100); and a light fade controller (106), comprising:

an input power detection circuit (210) configured to detect whether the input power is available to the driver circuit (102); and a power discharge circuit (214) configured to enable a power discharge path (118, 306) to discharge output power from the driver circuit (102) through the power discharge path in response to the input power detection circuit (210) detecting that the input power is unavailable to the driver circuit (102) and to adjust a rate of power discharge through the power discharge path; and wherein the power discharge circuit; (1) includes a switch that is controlled by a width modulation (PWM) control signal to enable and disable the power discharge path and to adjust the rate of power discharge through the power discharge path, and wherein a pulse width of the PWM signal is adjusted to enable and disable the power discharge path and to adjust the rate of power discharge through the power discharge path, or (2) is configured to adjust the rate of power discharge based on a user input provided to the power discharge circuit.

6. The driver unit of claim 5, wherein the input power is alternating current (AC) power.

7. The driver unit of claim 6, wherein the light fade controller further comprises an isolation unit configured to electrically isolate the input power from the power discharge circuit.

8. The driver unit of claim 5, wherein the power discharge circuit is configured to disable or maintain as disabled the power discharge path in response to the input power detection circuit (210) detecting that the input power is available to the driver circuit.

9. The driver unit of claim 5, wherein the power discharge circuit (214) operates using the output power to enable the power discharge path.

* * * * *